June 25, 1968 H. S. TELLER, JR 3,390,353
TRANSISTOR OSCILLATOR CIRCUIT WITH A RESISTOR NETWORK FOR STABILIZATION AGAINST BETA VARIATIONS
Filed May 8, 1967
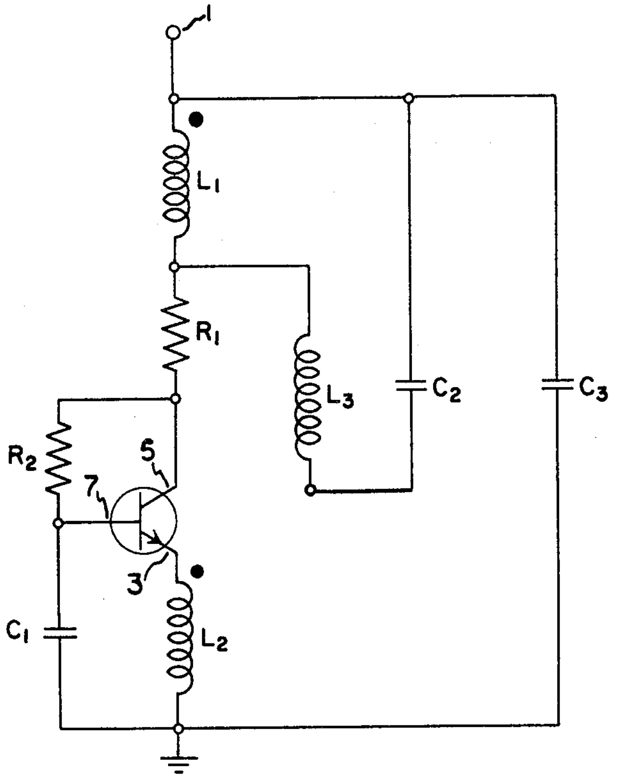
INVENTOR:
HOWARD S. TELLER, JR.
BY William S. Wolfe
HIS ATTORNEY.

United States Patent Office 3,390,353

Patented June 25, 1968

3,390,353

TRANSISTOR OSCILLATOR CIRCUIT WITH A RESISTOR NETWORK FOR STABILIZATION AGAINST BETA VARIATIONS

Howard S. Teller, Jr., Whitesboro, N.Y., assignor to General Electric Company, a corporation of New York Filed May 8, 1967, Ser. No. 636,900
5 Claims. (Cl. 331—117)

ABSTRACT OF THE DISCLOSURE

A transistor oscillator of the type including a first inductor in the collector circuit inductively coupled in regenerative feedback relationship to a second inductor in the emitter circuit, the oscillator including a first resistor connected between the first inductor and collector electrode and a second resistor connected between the collector and base electrodes. The resistor network compensates for beta variations between different transistors and for a given transistor over its lifetime. A conventional transistor ratio 455 kc. IF transformer may be employed for the three inductors.

*Background of invention*

Transistor oscillators are known in the prior art employing a first inductor connected directly to the collector electrode of the transistor and a second inductor connected via a capacitor to the emitter electrode thereof, the second inductor being inductively coupled to the first inductor in such a manner as to provide regenerative feedback between the collector and emitter electrodes of the transistor. A third inductor inductively coupled to the first and second inductors is generally provided having a capacitor connected in shunt therewith, the third inductor and capacitor comprising a resonant circuit defining the frequency of oscillation of the oscillator. A single transformer is commonly employed for the first, second and third inductors, the first and third inductors being the adjacent portions of the center tapped primary of the transformer while the second inductor comprises the secondary of the transformer.

It was necessary in the prior art circuit to provide bias stabilization to compensate for $\beta$ variations between different transistors and for a given transistor over its lifetime. Such stabilization was achieved in the prior art by the use of voltage divider comprising two resistors serially connected across the voltage supply, the intermediate point of the voltage divider being connected to the base of the transistor and an emitter resistor being employed in the emitter circuit of the transistor. In such a circuit, the first inductor was connected directly to the collector electrode of the transistor.

This prior art circuit employed an excessive amount of components to achieve stabilization and accordingly, added undue expense to the oscillator. Further, the transformer employed in the prior art circuit was by necessity a high tolerance, and accordingly expensive, device since no means of feedback control was provided.

*Summary*

Accordingly, it is an object of the invention to provide an improved and simplified transistor oscillator.

Another object is to provide a transistor oscillator utilizing a minimum number of components for effective stabilization.

A further object of the invention is to provide a transistor oscillator wherein readily available, low tolerance transformers can be utilized.

These and other objects are achieved in one embodiment of the invention by the use of a first inductor connected to the collector electrode via a first resistor. A second inductor is directly connected to the emitter electrode, the second inductor being inductively coupled to the first inductor to provide regenerative feedback between the collector and emitter electrodes. A third inductor having a capacitor connecting in shunt therewith to provide a resonant circuit defining the frequency of oscillation, is inductively coupled to the first and second inductors. A second resistor is connected between the collector and base electrodes.

In this manner, the first and second resistors provide the necessary stabilization while the first resistor also provides feedback control whereby a readily available and inexpensive transformer can be employed for the first, second and third inductors. In a particularly successful embodiment of the invention, the transformer is a standard 455 kc. intermediate frequency (IF) transformer.

*Detailed description*

Other objects and advantages of the invention may better be understood by reference to the following detailed description in which:

The single figure is a schematic representation of the transistor oscillator circuit of the invention.

Referring to the figure, there is shown a transistor oscillator adapted for energization from a source of positive potential applied between a terminal 1 and ground. As depicted, a transistor $T_1$ is provided comprising emitter, collector and base electrodes 3, 5, and 7 respectively.

A first inductor $L_1$ is connected between the source of power at the terminal 1 and the collector 3 via a first resistor $R_1$, a second resistor $R_2$ connecting the collector electrode 5 to the base electrode 7. A second inductor $L_2$ is connected directly between the emitter electrode 3 and ground. A base bypass capacitor $C_1$ for bypassing AC currents from the base electrode is connected between the base electrode 7 and ground in conventional fashion.

The inductors $L_1$ and $L_2$ are inductively coupled in the polarity shown so that the mutual inductance therebetween provides regenerative feedback between the collector electrode 5 and the emitter electrode 3 in known fashion A third inductor $L_3$ is connected to the junction between the first inductor $L_1$ and the first resistor $R_1$, a capacitor $C_2$ being connected in shunt with the inductors $L_1$ and $L_3$ as shown. The inductor $L_3$ is inductively coupled to the inductors $L_1$ and $L_2$ and in conjunction with the capacitor $C_2$ provides an oscillation frequency defining tank circuit. A collector bypass capacitor $C_3$ for bypassing AC currents is connected between the terminal 1 and ground in conventional fashion. An output can be derived from either the collector or base circuits in known fashion.

The operation of the oscillator of the invention is such that an oscillatory circulating current is developed in the tank circuit comprising the inductors $L_3$, $L_1$ and capacitor $C_2$, the frequency of the circulating current being defined by the value of inductance of inductors $L_3$ and $L_1$ plus the value of the associated mutual inductances and the capacitance of the capacitor $C_2$. An oscillating collector current is caused to flow through the resistor $R_1$, the collector-emitter circuit of the transistors $T_1$ and the inductor $L_2$ to ground, this collector current being at a frequency defined by the aforementioned tank circuit. The oscillations are sustained due to the mutual inductance between the inductor $L_1$ and the inductor $L_2$ whereby variations in the collector current are regeneratively fed back to the emitter.

In accordance with an important feature of the invention, the value of the resistor $R_1$ is selected to provide an optimum value of collector current and thus to control the feedback between the inductors $L_1$ and $L_2$. Thus, should the turns ratio between $L_1$ and $L_2$ vary as commonly happens in practice where a single transformer is employed for the inductors $L_1$, $L_2$ and $L_3$, the value of the resistor $R_1$ can easily be changed to maintain the feedback at an optimum level. Thus, as $R_1$ becomes larger a greater portion of the available power is dissipated across the resistor $R_1$ and the feedback is decreased. When $R_1$ is increased to a large value such that the loop gain becomes less than unity, oscillations are no longer sustained.

In accordance with another important aspect of the invention, the resistor $R_1$ in conjunction with the resistor $R_2$ provides stabilization for variation in $\beta$ between transistors and for $\beta$ changes of a given transistor during its lifetime.

Thus, where due to $\beta$ variations the collector current tends to increase (i.e. an increased $\beta$) a greater portion of the voltage will be dropped across the resistor $R_1$ and the collector voltage will tend to decrease. Since the base current is determined by the value of the resistor $R_2$ and the collector voltage, a decrease in collector voltage will result in a decrease in the base current. The decrease in base current in turn results in a corresponding decrease in collector current to thereby maintain a relatively constant collector current although $\beta$ might vary significantly.

Similarly, where the $\beta$ variations are such that the collector current tends to decrease (i.e. a decreased $\beta$), the collector voltage will tend to increase. As the collector voltage tends to increase, the base current which is determined by the collector voltage and the value of the resistor $R_2$ tends to increase. As the base current increases, the collector current correspondingly tends to increase to thereby maintain a relatively constant collector current although $\beta$ might vary significantly.

Thus, through the use of the resistors $R_1$ and $R_2$, the necessary stabilization is achieved in simplified fashion while at the same time providing feedback control without the necessity for additional elements.

In a particularly successful embodiment of the invention a conventional transistor radio 455 kc. IF transformer was employed, the inductors $L_1$ and $L_3$ comprising adjacent portions of the center tapped primary of the transformer and the inductor $L_2$ comprising the secondary thereof. The resistor $R_1$ is selected to provide optimum feedback between the inductors $L_1$ and $L_2$ and can easily be changed to a different value where the turns ratio of these two inductors varies somewhat as happens in practice. Thus, through the use of the resistor $R_1$, a relatively inexpensive, readily available transformer can be employed. Further, through the use of the resistor $R_1$ in conjunction with the resistor $R_2$ to obtain stabilization, as well as feedback control, a minimum number of components are required.

In the particularly successful embodiment of the invention, the oscillator was employed as a beat frequency oscillator in a radio receiver, the oscillator being tuned to 456 kc. to beat with the 455 kc. IF frequency to provide a 1 kc. tone for Consolan station reception in the long wave band. This beat frequency oscillator was similarly employed to receive CW code transmissions in the shortwave band.

In the particularly successful embodiment of the invention, the following circuit values and components were employed:

| | | |
|---|---|---|
| $R_1$ | | 2.2K |
| $R_2$ | | 33K |
| $C_1$ | mfg | .005 |
| $C_2$ | pf | 180 |
| $C_3$ | mfd | .05 |
| $L_1$ | $\mu$h | 6.75 |
| $L_2$ | $\mu$h | 1.2 |
| $L_3$ | $\mu$h | 608 |
| $T_1$ | | (1) |
| Operating voltage | volts | 4 |

[1] Type Fairchild SE 1000 (Silicon) NPN.

It was found that with such a circuit, transistors having $\beta$'s in the range from 50–100 operated satisfactorily and that the resistance of resistor $R_1$ could be varied to compensate for variations in the turns ratio of $L_1$ and $L_2$ encountered within manufacturing tolerances of the IF transformer employed.

Although the invention has been described with respect to a particular embodiment, it will be appreciated that modifications and changes may be made by those skilled in the art without departing from the true spirit and scope of the invention.

What is claimed and desired to be secured by Letters Patent of the United States is:

1. An oscillator circuit comprising:
(a) a transistor having emitter, collector and base electrodes,
(b) a source of operating voltage having first and second terminals,
(c) a first inductor and first resistor serially connected in the order named between said first terminal and said collector electrode,
(d) a second inductor serially connected between said emitter electrode and said second terminal, said second inductor being inductively coupled to said first inductor to provide regenerative feedback between said collector and emitter electrodes,
(e) a third resistor connected between said collector and base electrodes,
(f) a third inductor connected to the junction between said first inductor and said first resistor,
(g) said third inductor being inductively coupled to said first and second inductors and having a capacitor connected in shunt therewith to define a resonant circuit at the desired frequency of oscillation of said oscillator.

2. The oscillator circuit defined in claim 1 wherein said first and third inductors comprise a single center tapped primary winding and said second inductor comprises a secondary winding, said center tap being connected to said first resistor.

3. The oscillator circuit defined in claim 2 wherein said first, second and third inductors comprise a 455 kc. IF transformer.

4. The oscillator circuit defined in claim 1 including a second capacitor connected between said base electrode and said second terminal.

5. The oscillator circuit defined in claim 1 wherein said capacitor is connected between the end of said third inductor not connected to said junction and said first terminal.

No references cited.

JOHN KOMINSKI, *Primary Examiner.*

ROY LAKE *Examiner.*